(No Model.)
H. T. HAZARD.
CHARGER FOR POWDER FLASKS.
No. 298,085. Patented May 6, 1884.
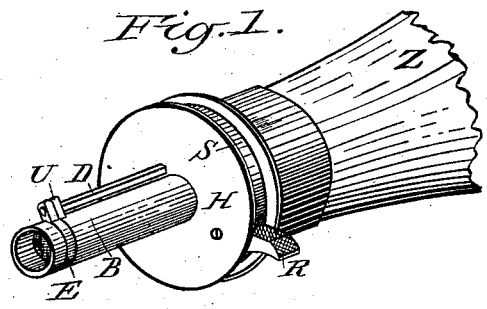
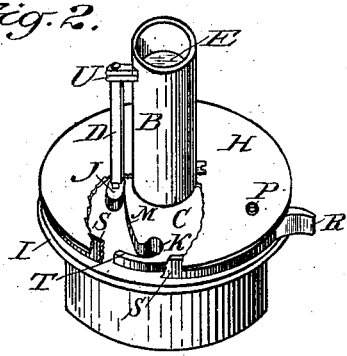 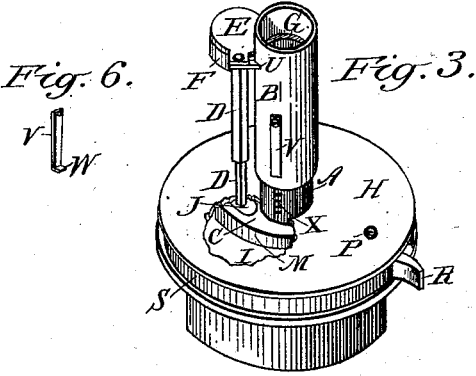
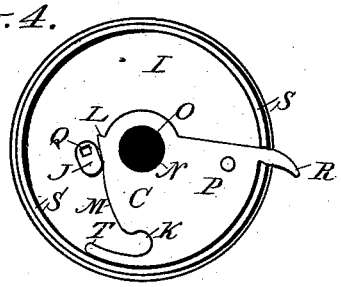 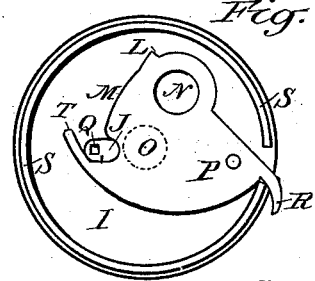
Witnesses.
Jas. R. Townsend
A. J. King
Inventor.
Henry T. Hazard

UNITED STATES PATENT OFFICE.

HENRY T. HAZARD, OF LOS ANGELES, CALIFORNIA.

CHARGER FOR POWDER-FLASKS.

SPECIFICATION forming part of Letters Patent No. 298,085, dated May 6, 1884.

Application filed August 11, 1883. (No model.)

*To all whom it may concern:*

Be it known that I, HENRY T. HAZARD, a citizen of the United States, residing at Los Angeles, in the county of Los Angeles and State of California, have invented a new and useful Improvement in Chargers for Powder-Flasks, of which the following, taken in connection with the accompanying drawings, is a specification.

My invention relates to that class of chargers used on powder-flasks; and the improvement I claim consists, principally, in operating an outer cut-off gate by its connection, in the manner shown, with the usual cut-off used on powder-flasks, whereby the exact charge desired is readily and accurately deposited in the gun, or in an empty cartridge-shell in loading cartridges, and at no time is there a continuous passage from the outside to the inside of the flask, and the entire charge is completely separated from the mass of powder in the flask before any whatever is permitted to pass out, and the outer cut-off gate is shut and locked before any powder whatever is permitted to enter the charger from the flask, rendering the flask safe and convenient.

Figure 1 is a perspective view of my invention, showing the outer cut-off gate closed as it stands at rest. Fig. 2 is a perspective view with a portion of the outer cap-plate cut away to show the position of the inner cut-off gate, C, and the dog J when the charger is closed. Fig. 3 is a perspective view of my invention with the measuring-tube extended, a portion of the cap-plate being cut away to show the position of the inner cut-off gate, C, and dog J when the charger is open. Fig. 4 is a plan view showing the position of the inner cut-off and the dog when the charger is closed. Fig. 5 is a plan view showing their position when the charger is open. Fig. 6 is a perspective view of the spring-catch V.

The charger consists of two tubes, A and B, the outer tube, B, telescoping upon the inner tube, A, which is mounted upon the cap-plate H.

In the side of the tube B, and near its outer end, there is a slot, G, through which the outer cut-off gate, E, is operated. This outer cut-off gate is rigidly attached to the rod D, which is mounted upon the bearing U, and extends back through the outer cap-plate, H, and passes through the dog J. The lower part of this rod is square, and fits the opening Q in the dog J, so that the movement of the dog will operate the outer gate, E. The inner cut-off gate, C, is much the same as those on powder-flasks now in ordinary use, except that the opening N is so situated that when the gate C is held at rest by the spring S this opening N registers with the passage O into the flask, (when in this position the charger will be filled with powder, the flask being inverted,) and that portion of the edge of the cut-off C which engages the dog J when the cut-off is operated is the arc of a circle of which the pivot P is the center. At one end of this curve are the recess K and the arm T. At the other end is a slight projection, L, from the curve, the object of which is to firmly lock the cut-off E while at rest. The outer cut-off gate, E, mounted upon the connecting-rod D, will be locked in its closed position when the curve M or the projection L engages with the dog J. When the cut-off C is rotated far enough to cause the arm T to engage the dog J, the dog is turned into the recess K, and the rod D rotates and opens the outer cut-off gate, E, as shown in Fig. 3.

It will be apparent that the outer gate, E, will always be closed and locked, except when the dog J is in the recess K, at which time it will be opened. Now, if the edge M of the cut-off C pressed firmly against the dog J, it would occasion too much friction in working the cut-off C. Therefore the edge is made to fit nicely, but not tightly, against the dog, and at the last part of the movement of the cut-off C the shoulder L is crowded against the dog J and tightly locks the outer cut-off, E. A spring, V, having a lug, W, Figs. 3 and 6, upon its free end, is mounted upon the outer tube, B, so that the lug W passes through an opening in the outer tube into notches X on the inner tube, A, for the purpose of adjusting the same to measure the charge required, the graduation-marks showing the different charges being placed on the inner tube. (Not shown in the drawings.) The rod D extends back into the flask through an opening in the inner plate, I, so that when the tube B is drawn out to increase the charge the connection with the dog J will be preserved. The rod D may be made in two parts, one of which is rigidly attached to the dog J, and projects out and into a longitudinal socket formed in the other part of the rod, to which the outer cut-off is attached.

The operation is as follows: While the charger is not in use, the spring S holds the gate C in its open position, and the gate E is closed, thus allowing the powder to enter and fill the charge-tube when the flask is inverted. By pressing upon the thumb-piece R, the gate C is rotated upon its pivot P and closes the opening at O, after which the arm T engages the dog J and turns it round into the recess K, thus revolving the stem D and opening the gate E, so that the charge may pass out. The pressure upon the thumb-piece is then removed, the gate assumes its former position, the charger is allowed to fill as before, and the operation is repeated. By this means the powder in the charger is completely cut off from that in the flask before any portion of it is allowed to escape, thus securing exact uniformity in the charge. As the outer gate does not begin to recede until the inner one is completely closed, there is no possibility of leakage and no danger of the explosion of the powder in the flask, as at no time is there a continuous opening into the flask from the outside. A hood, F, is mounted on the outer gate, E, and, projecting therefrom along the tube B toward the flask, will close any opening through the slot G into the charger that is not filled by the gate E.

What I claim, and desire to secure by Letters Patent, is—

1. The following elements in combination, substantially as shown: the inner cut-off gate, C, pivoted at P, and having thumb-piece R, hook T, recess K, shoulder L, and discharge-opening N, the dog J, having opening Q for the reception and operation of the square part of the rod, the rod D being square at one end, and to the other end is rigidly affixed an outer cut-off gate, E, on which gate is mounted the hood F, the charge-tube A, mounted on the face-plate H, and projecting into the charge tube B, and having indentations X, the outer tube, B, movably attached to the tube A, through which is cut the slot G and hole for the catch W, on which tube is mounted the support U, in which the rod D rotates, the spring S, the face-plates H and I, the flask Z, and the spring V, having catch W.

2. The arm D, on which is mounted the cut-off gate E, and having apron F, in combination with the dog J, having the hole Q, the cut-off C, pivoted at P and being recessed at K, and having the arm T, shoulder L, and thumb-piece R, the spring S, the spring V, having catch W, and the charge-tubes A and B, substantially as and for the purpose shown.

3. The spring V, mounted on the tube B, and having rigidly affixed on its free end the catch W, which projects through a hole in the tube B into indentations X on the inner tube, A, holding thereby the tube B in proper position on the tube A, and being the means of properly regulating the charges, in combination with the tube B and the tube A, as shown.

4. The arm D, having rigidly affixed thereon the cut-off E, and being mounted on the side of the measuring-tube B, as shown, which arm D extends down into the flask through the hole Q in the dog J, the dog J having opening Q, in combination with the cut-off C, having the thumb-piece R and opening K, and being pivoted on the screw P, the spring S, the measuring-tubes A and B, and spring V, whereby upon the pressure upon the thumb-piece R the opening O will be first closed, separating an exact charge, and by the further movement of the thumb-piece the cut-off E will be opened, leaving the charge free to fall.

5. The charger for powder-flasks, consisting of the slotted charge-tube, the outer cut-off gate, E, mounted upon the connecting-rod D, the dog J, and lower cut-off gate, C, having arm T, curve M, recess K, and shoulder L, all in combination, substantially as shown, whereby the outer gate is operated by the rotation of the inner cut-off gate after the opening into the flask is completely closed.

6. The combination, in a powder-charger, of the following elements: the adjustable tube A B, having slot G and bearing U, the cut-off gate E, connecting-rod D, dog J, spring S, and inner cut-off gate, C, having shoulder L, curve M, recess K, and arm T, substantially as and for the purpose shown and described.

7. In a powder-charger, the rotary rod D, mounted longitudinally on the measuring-tube B, having an outer cut-off gate, E, rigidly affixed to its outer end, the inner end extending through the dog J, said dog being so arranged as to rotate by its engagement with the arm T on the gate C, whereby the outer gate, E, will be opened after the inner gate, C, has closed the channel into the flask.

8. In a powder-charger, the inner cut-off gate, C, having an irregular edge, substantially as shown, in combination with the dog J, operated thereby, and the rod D, supporting the outer rotary cut-off gate, E, whereby said outer gate, E, is operated by the movement of the inner cut-off.

9. In a powder-charger having an inner and an outer cut-off gate, the inner cut-off gate, C, having the discharge-opening L at such a point therein as to register with the passage into the flask when the charger is not being operated, and being connected with the outer cut-off gate by the rotary arm D and dog J, substantially as shown, whereby the measuring-tube will contain an exact charge while the operative parts are at rest.

10. A powder-charger having a measuring-tube, B, arm D, mounted longitudinally thereon, and adapted to operate by rotation by means shown, and an outer cut-off gate, which is rigidly affixed on said arm, which arm is rotated by its combination, as shown, with an inner cut-off gate, C, the inner gate in the first part of its movement closing the channel from the flask to the measuring-tube, after which, by its further movement, the arm D is caused to rotate, thereby opening the outer gate.

11. In a powder-charger, the combination of a measuring-tube, a cut-off gate at or near its outer end, a rotating rod carrying said outer cut-off gate, and provided at its inner end with a lateral arm, an inner cut-off gate provided with an orifice which normally registers with the measuring-tube and with a curved recess, K, and a spring serving to hold the inner cut-off gate normally open, the parts being constructed and arranged to operate substantially as described, whereby a movement of the inner gate is caused first to close the inner end of the tube, and then to open the outer end, substantially as explained.

12. In combination with tube B, having opening G in its side, gate E, passing through said opening and limited in its inward movement by the tube, rod D, carrying gate E, and provided with dog S, and the inner cut-off gate, C, having curved face M, concentric with its pivot, and recess K, all substantially as shown, whereby the outer gate is locked shut until the slide C moves so far as to bring the recess K opposite the dog S, whereupon the latter is permitted to move laterally, thereby carrying the gate E out of the tube, as explained.

13. The combination, substantially as shown and described, of tube B, having opening G, gate E, rod D, provided with dog S, and inner gate, C, having curved face M, inclined shoulder L, and recess K, all substantially as and for the purpose set forth.

14. In combination with telescopic tube A B, gate E, and dog S, a polygonal rod, D, carrying said gate E, and passing freely through a polygonal opening in said dog, and cap-plates H I, or equivalent supports, one above and the other below the dog, whereby the tube may be lengthened and shortened without disconnecting the gate and the dog.

HENRY T. HAZARD.

Witnesses:
 JAS. R. TOWNSEND,
 L. D. CLARK.